United States Patent
Chen

(10) Patent No.: US 7,231,499 B2
(45) Date of Patent: Jun. 12, 2007

(54) PRIORITIZATION OF REAL TIME / NON-REAL TIME MEMORY REQUESTS FROM BUS COMPLIANT DEVICES

(75) Inventor: Shen-Yung (Robin) Chen, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 281 days.

(21) Appl. No.: 10/740,085

(22) Filed: Dec. 17, 2003

(65) Prior Publication Data

US 2005/0138300 A1   Jun. 23, 2005

(51) Int. Cl.
    *G06F 12/00*   (2006.01)
(52) U.S. Cl. .......................... 711/151; 710/40
(58) Field of Classification Search .................. 711/151
    See application file for complete search history.

(56) References Cited

U.S. PATENT DOCUMENTS

| | | | | |
|---|---|---|---|---|
| 4,115,851 A | * | 9/1978 | Nagano et al. | 711/109 |
| 5,581,732 A | * | 12/1996 | Dann | 711/148 |
| 5,913,224 A | * | 6/1999 | MacDonald | 711/125 |
| 6,021,476 A | * | 2/2000 | Segars | 711/163 |
| 6,330,656 B1 | * | 12/2001 | Bealkowski et al. | 712/13 |
| 6,374,323 B1 | * | 4/2002 | Stracovsky et al. | 711/5 |
| 2001/0010066 A1 | * | 7/2001 | Chin et al. | 711/108 |

* cited by examiner

Primary Examiner—Brian R. Peugh
Assistant Examiner—Hashem Farrokh
(74) Attorney, Agent, or Firm—McAndrews, Held & Malloy, Ltd.

(57) ABSTRACT

One or more methods and systems of prioritizing access of physical memory space to bus compliant devices in a computing device is presented. Prioritization is based on real time or non-real time device functionality. In one embodiment, the method of accessing physical memory space for use by a bus compliant device comprises receiving a memory request from the device through a data bus. In addition, the method comprises comparing addresses of the memory request to a range of memory addresses stored in a memory request comparator. In one embodiment, the system for prioritizing the access of physical memory space in response to memory requests comprises one or more device and/or bus drivers, and a memory request comparator. The one or more device and/or bus drivers facilitates implementation of address ranges within said memory request comparator for one or more bus compliant devices.

29 Claims, 3 Drawing Sheets

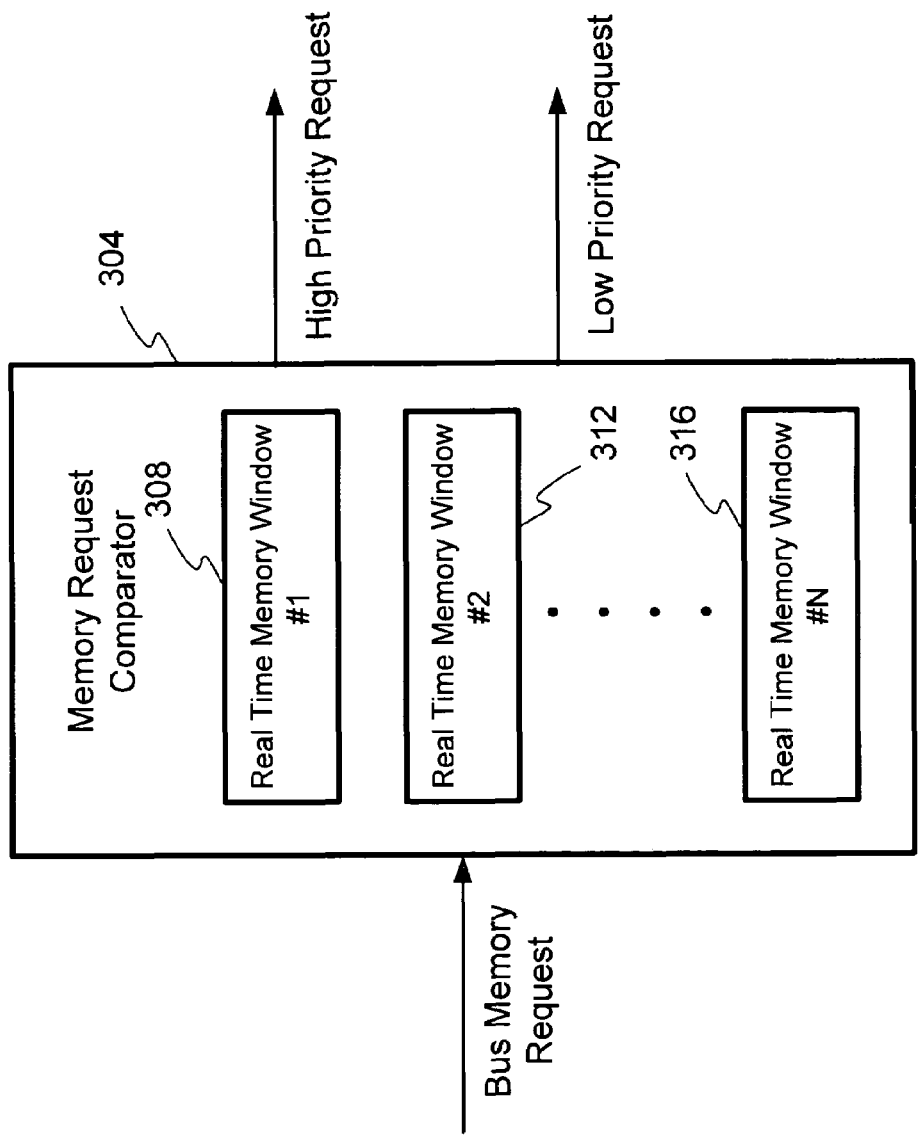

PRIORITIZATION OF REAL TIME / NON-REAL TIME MEMORY REQUESTS FROM BUS COMPLIANT DEVICES

RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

Immediate processing of data is very important when a device within a computing system runs a real time application. Such real time applications may involve the processing of video or audio. The device may require adequate bandwidth from one or more sources in order to effectively display images or reproduce audio. The device may require access to data stored in a memory of the computing system.

Such computing systems may utilize a memory controller to access data stored in memory. The memory controller may employ a device called a memory arbiter that handles requests from one or more devices requiring access to data stored in memory. These devices may communicate to the memory using one or more data buses resident in the computing system.

Often, a device running a real time application may not be able to receive data from main memory at a required rate. One or more other devices performing non-real time applications may consume bandwidth required by the device running the real time application. For example, a digital camcorder may require transmission of data from main memory at a sufficient rate in order to properly display video on a monitor. When other devices compete for memory resources, access to memory may not be provided to the most critical applications such as those which involve real time processing of data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method and system to prioritize access to physical memory space in a main memory by way of categorizing memory requests transmitted by one or more devices communicating by a data bus. The memory requests are categorized as real time or non-real time. Real time memory requests have higher priority and are to be performed prior to non-real time memory requests.

In one embodiment, the method comprises prioritizing access to memory by one or more devices. The method comprises generating one or more ranges of memory addresses within a memory request comparator for each of said one or more devices capable of performing a real time application. The method comprises receiving one or more memory requests from said one or more devices through a data bus and comparing one or more addresses of the one or more memory requests to the one or more ranges of memory addresses. The method further comprises transmitting one or more high priority requests if the one or more addresses of the one or more memory requests are within the one or more ranges.

In one embodiment, the system for accessing memory space for use by one or more devices comprises one or more device drivers, one or more bus drivers, and a memory request comparator. The one or more device drivers and the one or more bus drivers facilitate transmission of memory address ranges associated with one or more bus compliant devices.

These and other advantages, aspects, and novel features of the present invention, as well as details of illustrated embodiments, thereof, will be more fully understood from the following description and drawings.

BRIEF DESCRIPTION OF THE DRAWINGS

FIG. 3 is a block diagram of a memory request comparator in accordance with an embodiment of the invention.

DETAILED DESCRIPTION OF THE INVENTION

Aspects of the present invention may be found in a system and method to prioritize access to memory by way of categorizing memory requests transmitted by one or more bus compliant devices in a computing system. The memory may comprise physical memory such as random access memory. In general, the memory requests may be requests generated by one or more bus compliant devices or other peripheral devices used to access the memory. The memory requests generated by the bus compliant devices are categorized as either a memory request associated with a real time application or a memory request associated with a non-real time application. A real time memory request is given a higher priority for allocating physical memory compared to that of a non-real time memory request. As a result, the memory request may be prioritized as a high priority memory request or a low priority memory request based on whether the memory request generated by the bus compliant device is associated with a real time application or a non-real time application.

Figure 1:
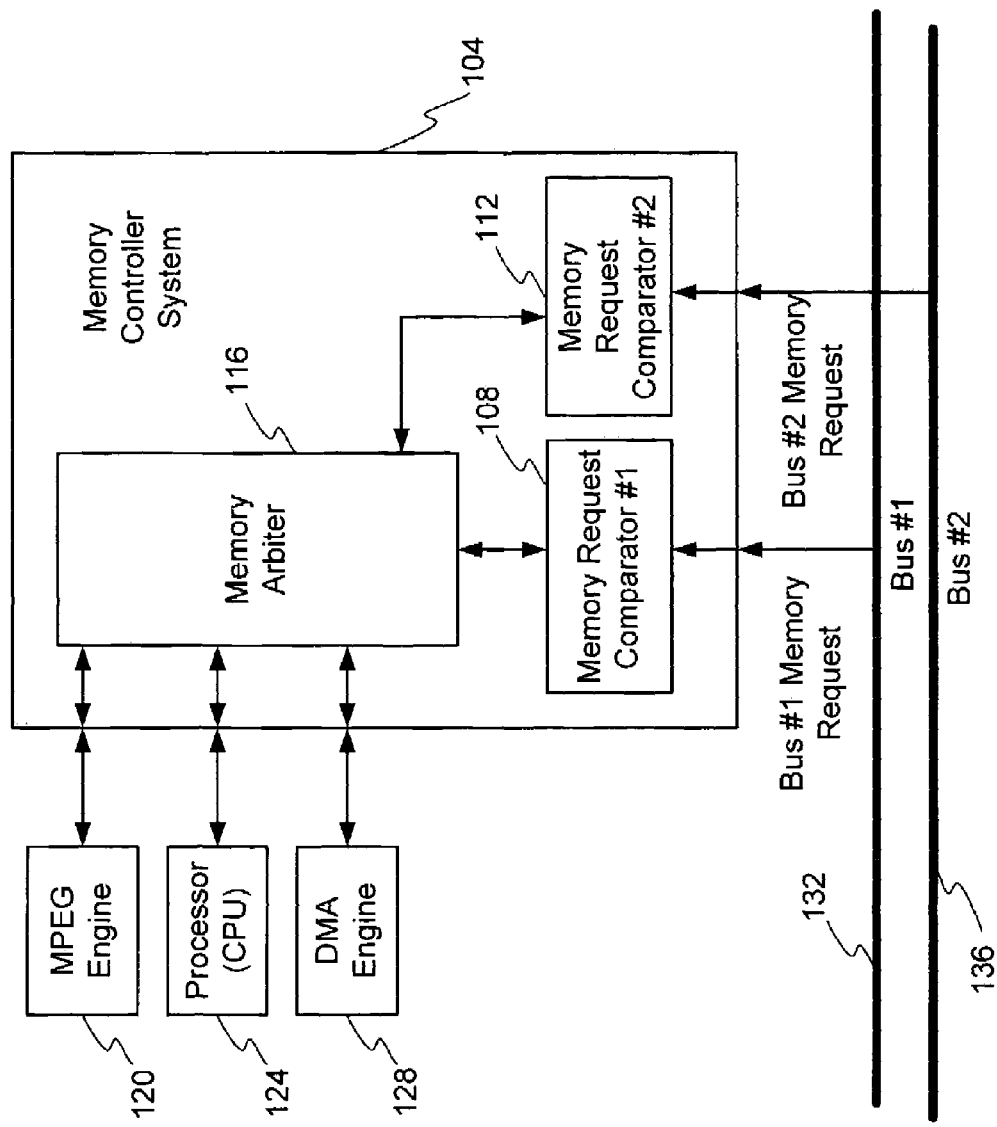
FIG. 1 illustrates a block diagram of a memory controller system in which memory requests transmitted by buses are prioritized based on whether the memory request relates to a real time application or a non-real time application, in accordance with an embodiment of the invention.

FIG. 1 illustrates a block diagram of a memory controller system 104 in which memory requests generated from buses 132, 136 are prioritized based on whether the memory request relates to a real time application or a non-real time application, in accordance with an embodiment of the invention. As shown the memory controller system 104 may interface with a number of different functional entities. In this exemplary embodiment, the memory controller system 104 interfaces with a first data bus 132, a second data bus 136, an MPEG engine 120, a processor 124, and a DMA engine 128. The first data bus 132, second data bus 136, MPEG engine 120, processor 124, and DMA engine 128 may each generate memory requests to the memory controller system 104. The memory controller system 104 comprises a memory arbiter 116, a first memory request comparator 108, and a second memory request comparator 112. The memory arbiter 116 examines the one or more requests to determine the order of execution of received memory requests. The memory request comparators 108, 112 receive bus memory requests from their respective buses. The bus memory requests may be categorized as a real time request or a non-real time request based on the type of bus memory request received by the memory request comparators 108, 112. The memory request comparators 108, 112 process these bus memory requests to generate a prioritized sequence of memory requests to the memory arbiter 116. The memory arbiter 116 categorizes these bus requests along with any other requests from other functional entities such as the exemplary MPEG engine 120, processor 124, or DMA engine 128, such that the main memory in a computing system is accessed in order of priority.

In one embodiment, the exemplary first data bus 132 or second data bus 136 of FIG. 1 may comprise a PCI, USB, ISA, EISA, or VESA data bus. It is contemplated that the first and second data buses 132, 136 may comprise any type of data bus.

Figure 2:
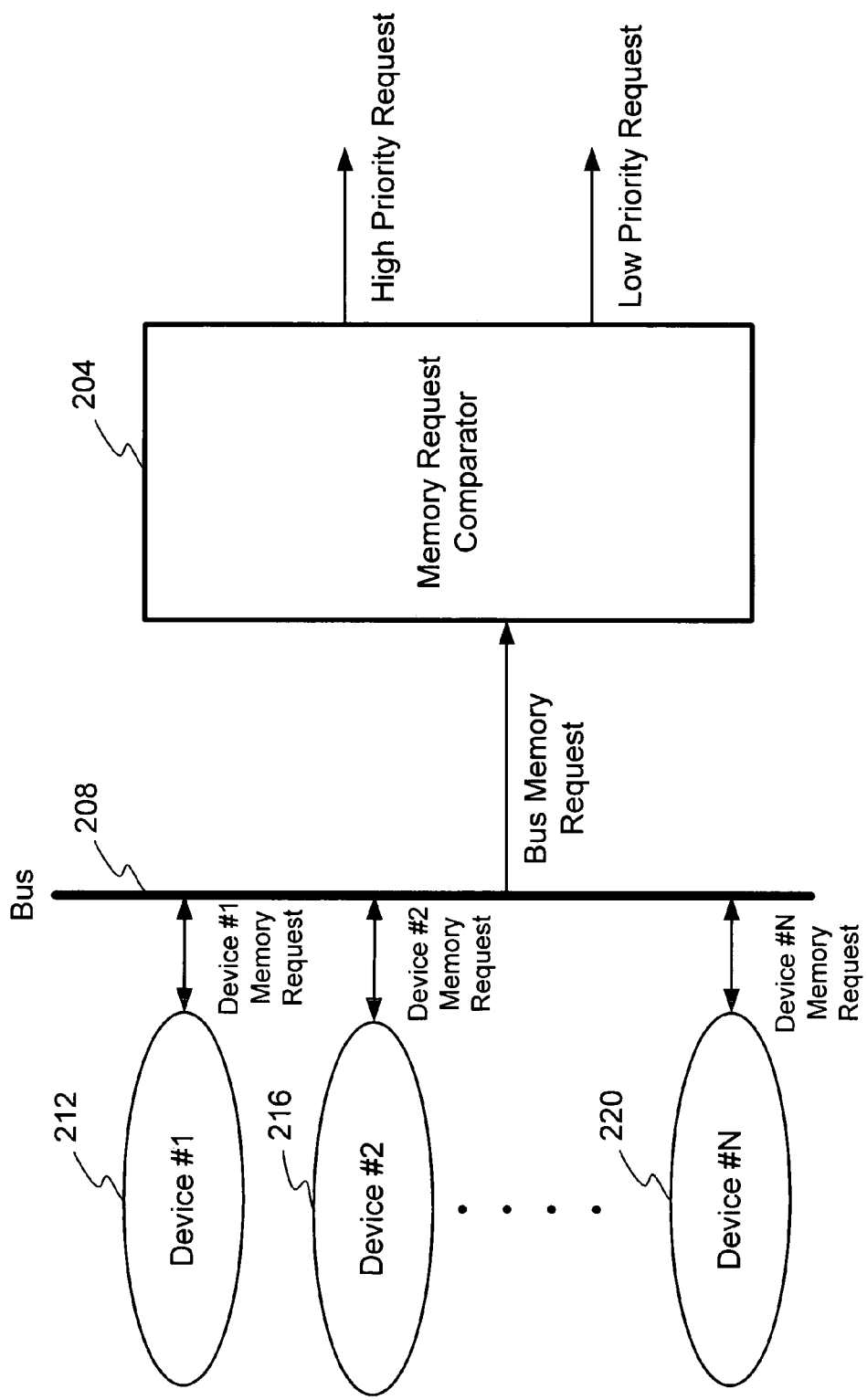
FIG. 2 is a block diagram of a subsystem of the embodiment illustrated in FIG. 1 that performs prioritization of memory requests transmitted by a data bus, in accordance with an embodiment of the invention.

FIG. 2 is a block diagram of a subsystem of the embodiment illustrated in FIG. 1 that performs prioritization of memory requests transmitted through a data bus (i.e., Bus 1 of FIG. 1), in accordance with an embodiment of the invention. The subsystem comprises a memory request comparator 204, a data bus 208, and a number of bus compliant devices (devices capable of communicating through a data bus) 212, 216, 220 communicatively coupled to the data bus 208. The memory request comparator 204 receives a bus memory request signal from the bus 208 based on memory requests made by the devices 212, 216, 220. The number of devices may comprise a total of N devices, each capable of generating a memory request. In one embodiment N=32. As shown in FIG. 2, there may be a total of N devices communicating to a memory request comparator 204 by way of the bus 208. As illustrated, device #1 212 may generate a device #1 memory request, device #2 may generate a device #2 memory request, while device #N 220 may generate a device #N memory request. It is contemplated that each of these devices utilizes software such as a suitable device driver and/or bus driver to perform such memory requests. Each device driver may specify a range of memory addresses associated with the memory request. The range of memory addresses may be used to determine whether the request to access memory is associated with a real time or a non-real time memory requirement of the device.

In one embodiment, a device driver and/or bus driver initially specifies a range of addresses that define a "real time memory window" implemented in the memory request comparator 204. The "real time window" within the memory request comparator 204 represents a portion of physical memory. It is contemplated that virtual memory used by an operating system may be mapped to corresponding physical memory (i.e., random access memory) by way of a callable system function provided by the operating system.

In one embodiment, each (bus compliant) device 212, 216, 220 that requires real time access to memory will program or configure the memory request comparator 204 with a range of addresses that are used during real time applications. These range of memory addresses are termed a "real time memory window". It is contemplated that one or more device or bus drivers from such devices may be utilized to program, implement, or configure "real time memory windows" into the memory request comparator 204.

When a memory access request is associated with addresses within a "real time memory window", the memory access request is appropriately categorized by the memory request comparator 204 as a high priority memory request. Otherwise, the memory request is categorized as a low priority memory request. The low priority memory request may be termed a round robin type of memory request, in which these requests are performed in order of occurrence of all low priority requests. Use of this technique allows the memory request comparator 204 to analyze the address space generated by a memory request and appropriately determine whether the request is associated with a real time application or a non-real time application. The memory request may in turn allocate a certain region of physical memory for use by the device. The memory request comparator 204 may transmit a first control signal to the memory arbiter when the memory request corresponds to a high priority request. Otherwise, the memory request comparator 204 may transmit a second control signal to indicate a low priority request. In one embodiment, the second control signal indicates a round robin request. It is contemplated that the device and/or bus drivers will initiate a data transfer between memory and the device by way of the DMA engine shown in FIG. 1.

The memory request comparator 204 comprises a circuitry such as logic gates and registers such that memory addresses of a memory access request received from a device may be compared to one or more "real time memory windows" defined by the memory request comparator 204. The memory request comparator 204 is configured with a "real time memory window" for each bus compliant device that performs a real time application. It is contemplated that a device's "real time memory window" is established in the memory request comparator 204 at the time the corresponding device is powered up. The real time functionality of a device may determine whether a "real time memory window" is implemented within the memory request comparator 204.

In one embodiment, a "real time memory window" is represented by a range of addresses that are fully defined by two values (termed boundary values hereinafter) stored in a pair of n-bit registers. The two boundary values correspond to the endpoints of the range of addresses. Each n-bit register of the pair of n-bit registers stores a value represented by one n-bit word. In one embodiment, n corresponds to 32 bits while in another embodiment, n corresponds to 64 bits. These boundary values configure one or more "real time memory windows" using one or more device drivers of each of the N devices described in FIG. 2. In one embodiment, the two boundary values are provided to a memory request comparator 204 by way of one or more device drivers or bus drivers.

When a device running a real time application or function requires access to memory, the corresponding device and/or bus drivers generate physical memory addresses that are located within the device's "real time memory window". The memory request comparator 204 may act as a comparator used to compare or verify addresses transmitted by a device and/or bus driver to a range of addresses defined by its "real time memory window". If the addresses fall within the "real time memory window", the memory request comparator 204 sends an appropriate control signal (i.e., to a memory arbiter) indicating that the memory request constitutes a real time request.

FIG. 3 is a block diagram of a memory request comparator 304 in accordance with an embodiment of the invention. The memory request comparator 304 comprises a number of "real time memory windows" 308, 312, 316. Each "real time memory window" 308, 312, 316 represents either virtual or physical memory space required by a device that performs a real time application. The mapping or translation may be performed by way of a system function invoked by the operating system. As shown, real time memory window #1 308 corresponds to a device #1, real time memory window #2 312 corresponds to a device #2, while real time memory window #N 316 corresponds to the Nth device. When a bus memory request generated by a device is associated with addresses that are contained within a "real time memory window", as determined by a memory request comparator 304, a high priority (real time) request signal may be transmitted to a memory arbiter of a memory controller system. Otherwise, a low priority request signal, such as a round robin type of request may be transmitted to the memory arbiter. Each bus compliant device capable of running a real time application may implement a "real time memory window" within the memory request comparator 304.

The memory arbiter executes memory requests based on order of priority. It is contemplated that the memory arbiter employs a priority system that incorporates the high/low priority request signals generated by each "real time memory window" of each memory request comparator, in order to effectively process memory access requests from all types of devices.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of prioritizing access to memory by one or more devices in a computing system comprising:
   generating one or more ranges of memory addresses within a memory request comparator for each of said one or more devices capable of performing a real time application;
   receiving one or more memory requests from said one or more devices through a data bus;
   comparing one or more addresses of said one or more memory requests to said one or more ranges of memory addresses; and
   transmitting one or more high priority requests if said one or more addresses of said one or more memory requests are within said one or more ranges, wherein said ranges of memory addresses are implemented using said memory request comparator, each of said ranges associated with said real time application, said memory request comparator comprising logic gates and registers.

2. The method of claim 1 wherein each of said one or more ranges of memory addresses is defined by two values provided by a software driver.

3. The method of claim 2 wherein said software driver comprises a device driver.

4. The method of claim 2 wherein said software driver comprises a bus driver.

5. The method of claim 1 wherein said comparing is performed by using said memory request comparator.

6. The method of claim 1 wherein a memory arbiter receives said one or more high priority requests.

7. The method of claim 6 wherein said one or more high priority requests effectuate real time access to memory.

8. The method of claim 1 further comprising transmitting one or more low priority requests if said one or more addresses of said one or more memory requests are not within said one or more ranges.

9. The method of claim 8 wherein said one or more low priority requests effectuate round robin access to memory.

10. The method of claim 1 wherein said data bus comprises a PCI, USB, ISA, EISA, or VESA data bus.

11. A system for prioritizing the access of memory in response to memory access requests made by one or more devices comprising:
    one or more device drivers;
    one or more bus drivers; and
    a memory request comparator, said one or more device drivers and said one or more bus drivers associated with one or more bus compliant devices, said one or more device drivers and said one or more bus drivers configuring address ranges within said memory request comparator.

12. The system of claim 11 wherein said memory request comparator comprises:
    logic gates; and
    registers.

13. The system of claim 12 wherein said registers comprise pairs of registers.

14. The system of claim 13 wherein said pairs of registers are used to define said address ranges.

15. The system of claim 14 wherein said address ranges are used by said one or more devices to determine whether one or more memory addresses of said memory access requests comprises a real time memory request or a non-real time memory request.

16. The system of claim 12 wherein said registers comprise 32 bit registers.

17. The system of claim 12 wherein said registers comprise 64 bit registers.

18. A system for prioritizing the access of physical memory in response to memory access requests made by one or more devices in a computing system comprising:
    one or more software drivers; and
    circuitry, said one or more software drivers associated with one or more bus compliant devices, said one or more software drivers defining one or more address ranges in said circuitry, said address ranges used to determine if said one or more bus compliant devices are performing a real time function.

19. The system of claim 18 wherein said circuitry comprises a pair of registers and logic gates.

20. A method of prioritizing access to memory by one or more devices in a computing system comprising:
    generating one or more ranges of memory addresses within a memory request comparator for each of said one or more devices capable of performing a real time application;
    receiving one or more memory requests from said one or more devices through a data bus;
    comparing one or more addresses of said one or more memory requests to said one or more ranges of memory addresses; and transmitting one or more high priority requests if said one or more addresses of said one or more memory requests are within said one or more ranges; and transmitting one or more low priority, requests if said one or more addresses of said one or more memory requests are not within said one or more ranges, wherein a memory arbiter receives said one or more low priority requests.

21. A method of prioritizing access to memory by one or more devices in a computing system comprising:

generating one or more ranges of memory addresses within a memory request comparator for each or said one or more devices capable of performing a real time application;

receiving one or more memory requests from said one or more devices through a data bus;

comparing one or more addresses of said one or more memory requests to said one or more ranges of memory addresses; and transmitting one or more high priority requests if said one or more addresses of said one or more memory requests are within said one or more ranges, wherein each of said one or more ranges of memory addresses is defined by two values provided by a software driver, wherein said two values defines the endpoints of each of said one or more ranges of memory addresses.

22. A method of prioritizing access to memory by one or more devices in a computing system comprising:

generating one or more ranges of memory addresses within a memory request comparator for each of said one or more devices capable of performing a real time application;

receiving one or more memory requests from said one or more devices through a data bus;

comparing one or more addresses of said one or more memory requests to said one or more ranges of memory addresses; and transmitting one or more high priority requests if said one or more addresses of said one or more memory requests are within said one or more ranges, wherein each of said one or more ranges of memory addresses is defined by two values provided by a software driver, wherein said software driver comprises a bus driver.

23. A method of prioritizing access to memory by one or more devices in a computing system comprising:

generating one or more ranges of memory addresses within a memory request comparator for each of said one or more devices capable of performing a real time application;

receiving one or more memory requests from said one or more devices through a data bus;

comparing one or more addresses of said one or more memory requests to said one or more ranges of memory addresses; and transmitting one or more high priority requests if said one or more addresses of said one or more memory requests are within said one or more ranges, wherein a memory arbiter receives said one or more high priority requests.

24. The method of claim 23 wherein said one or more high priority requests effectuate real time access to memory.

25. A method of prioritizing access to memory by one or more devices in a computing system comprising:

generating one or more ranges of memory addresses within a memory request comparator for each of said one or more devices capable of performing a real time application;

receiving one or more memory requests from said one or more devices through a data bus;

comparing one or more addresses of said one or more memory requests to said one or more ranges of memory addresses;

transmitting one or more high priority requests if said one or more addresses of said one or more memory requests are within said one or more ranges; and transmitting one or more low priority requests if said one or more addresses of said one or more memory requests are not within said one or more ranges wherein said one or more low priority requests effectuate round robin access to memory.

26. A method of prioritizing access to memory by one or more devices in a computing system comprising:

generating one or more ranges of memory addresses within a memory request comparator for each of said one or more devices capable of performing a real time application;

receiving one or more memory requests from said one or more devices through a data bus;

comparing one or more addresses of said one or more memory requests to said one or more ranges of memory addresses; and transmitting one or more high priority requests if said one or more addresses of said one or more memory requests are within said one or mare ranges, wherein said data bus comprises a PCI, USB, ISA, EISA, or VESA data bus.

27. A method of prioritizing access to memory by one or more devices in a computing system comprising:

generating one or more ranges of memory addresses within a memory request comparator for each said one or more devices capable of performing a real time function;

receiving a memory request from said one or more devices through a data bus; and comparing one or more addresses of said memory request to said one or more ranges of memory addresses, wherein said one or more ranges of memory addresses is defined by two values provided by a software driver, wherein said software driver comprises a bus driver.

28. A method of prioritizing access to memory by one or more devices in a computing system comprising:

generating one or more ranges of addresses within a memory request comparator for each said one or mote devices capable of performing a real time function;

receiving a memory request from said one or more devices through a data bus;

comparing one or more addresses of said memory request to said one or more ranges of addresses; and transmitting a low priority control signal if said one or more addresses is not within said one or more ranges of addresses wherein said low priority control signal effectuates a round robin access to memory.

29. A method of prioritizing access to memory by one or more devices in a computing system comprising:

generating one or more ranges of addresses within a memory request comparator for each said one or more devices capable of performing a real time function;

receiving a memory request from said one or more devices through a data bus;

comparing one or more addresses of said memory request to said one or more ranges of addresses, wherein said data bus comprises a PCI, USB, EISA, EISA, or VESA data bus.

* * * * *